US009316796B2

(12) United States Patent
Barwicz et al.

(10) Patent No.: US 9,316,796 B2
(45) Date of Patent: Apr. 19, 2016

(54) FIBER PIGTAIL WITH INTEGRATED LID (71) Applicants: International Business Machines Corporation, Armonk, NY (US); AFL Telecommunications LLC, East Duncan, SC (US)

(72) Inventors: Tymon Barwicz, Yorktown Heights, NY (US); Paul F. Fortier, Richelieu (CA); Ted Lichoulas, Simpsonville, SC (US)

(73) Assignees: INTERNATIONAL BUSINESS MACHINES CORPORATION, Armonk, NY (US); AFL TELECOMMUNICATIONS LLC, East Duncan, SC (US)

( * ) Notice: Subject to any disclaimer, the term of this patent is extended or adjusted under 35 U.S.C. 154(b) by 0 days.

(21) Appl. No.: 14/617,304

(22) Filed: Feb. 9, 2015

(65) Prior Publication Data
US 2015/0177466 A1 Jun. 25, 2015

Related U.S. Application Data (62) Division of application No. 13/804,269, filed on Mar. 14, 2013.

(51) Int. Cl.
G02B 6/44 (2006.01)
G02B 6/38 (2006.01)
G02B 6/36 (2006.01)
G02B 6/42 (2006.01)

(52) U.S. Cl.
CPC ............ *G02B 6/3861* (2013.01); *G02B 6/3636* (2013.01); *G02B 6/423* (2013.01); *Y10T 29/49826* (2015.01); *Y10T 156/1062* (2015.01)

(58) Field of Classification Search
USPC ....................................... 385/84–91
See application file for complete search history.

(56) References Cited

U.S. PATENT DOCUMENTS

| 5,071,213 A | 12/1991 | Chan |
| 5,319,725 A | 6/1994 | Buchmann et al. |
| 5,343,544 A | 8/1994 | Boyd et al. |
| 5,375,184 A | 12/1994 | Sullivan |
| 5,432,878 A | 7/1995 | Smous |
| 5,499,312 A | 3/1996 | Hahn et al. |

(Continued)

FOREIGN PATENT DOCUMENTS

| CN | 101702048 A | 5/2010 |
| CN | 102084277 A | 6/2011 |

(Continued)

OTHER PUBLICATIONS

A. Kumar et al., "Birefringence of optical fiber pressed into a V groove," Optics Letters, vol. 6, Issue 12, 1981, pp. 644-646.

(Continued)

*Primary Examiner* — Eric Wong
(74) *Attorney, Agent, or Firm* — Cantor Colburn LLP; Vazken Alexanian (57) ABSTRACT

A mechanism is provided for a fiber pigtail. The fiber pigtail includes a single mode fiber optic ribbon having a section of polymer ribbon removed to expose bare fibers, a fiber optic ferrule in contact with the single mode fiber optic ribbon at one distal end, and an integrated polymer lid permanently attached to the bare fibers of the single mode fiber optic ribbon at another distal end of the single mode fiber optic ribbon.

4 Claims, 8 Drawing Sheets

(56) References Cited

U.S. PATENT DOCUMENTS

| | | | |
|---|---|---|---|
| 5,625,730 A | 4/1997 | Ishikawa et al. |
| 5,671,315 A | 9/1997 | Tabuchi et al. |
| 6,097,871 A | 8/2000 | De Dobbelaere et al. |
| 6,108,472 A | 8/2000 | Rickman et al. |
| 6,157,759 A | 12/2000 | Seo et al. |
| 6,241,399 B1 | 6/2001 | Nobuhara |
| 6,257,772 B1 | 7/2001 | Nakanishi et al. |
| 6,415,082 B1 | 7/2002 | Wach |
| 6,470,117 B1 | 10/2002 | Tang et al. |
| 6,504,107 B1 | 1/2003 | Kragl |
| 6,517,257 B2 | 2/2003 | Nishikawa et al. |
| 6,553,173 B1 | 4/2003 | Goto |
| 6,631,228 B2 | 10/2003 | Gao et al. |
| 6,709,607 B2 | 3/2004 | Hibbs-Brenner et al. |
| 6,741,776 B2 | 5/2004 | Iwashita et al. |
| 6,780,944 B1 | 8/2004 | Miura et al. |
| 6,786,654 B2 | 9/2004 | Kilian |
| 6,860,642 B2 | 3/2005 | Vodrahalli et al. |
| 6,976,792 B1 | 12/2005 | Cohen et al. |
| 7,058,275 B2 | 6/2006 | Sezerman et al. |
| 7,095,928 B2 | 8/2006 | Blauvelt et al. |
| 7,197,224 B2 | 3/2007 | Rolston et al. |
| 7,223,025 B2 | 5/2007 | Benzoni et al. |
| 7,254,301 B2 | 8/2007 | Hoshino et al. |
| 7,292,756 B2 | 11/2007 | Moynihan et al. |
| 7,345,316 B2 | 3/2008 | Sherrer et al. |
| 7,404,680 B2 | 7/2008 | Ono et al. |
| 7,454,098 B1 | 11/2008 | Lamprecht et al. |
| 7,477,813 B2 | 1/2009 | Monma et al. |
| 7,488,119 B2 | 2/2009 | Yoshida et al. |
| 7,492,995 B2 | 2/2009 | Kuroda et al. |
| 7,616,852 B2 | 11/2009 | Ohtsu et al. |
| 7,729,581 B2 | 6/2010 | Rolston et al. |
| 7,738,753 B2 | 6/2010 | Assefa et al. |
| 7,779,158 B2 | 8/2010 | Ohhira |
| 7,794,158 B2 | 9/2010 | Yasuda et al. |
| 8,231,284 B2 | 7/2012 | Doany et al. |
| 8,313,252 B2 | 11/2012 | Sameshima et al. |
| 8,320,721 B2 | 11/2012 | Cevini et al. |
| 8,534,927 B1 | 9/2013 | Barwicz et al. |
| 8,545,108 B1 | 10/2013 | Barwicz et al. |
| 8,724,937 B2 | 5/2014 | Barwicz et al. |
| 2001/0004369 A1 | 6/2001 | Miyokawa et al. |
| 2002/0037138 A1 | 3/2002 | Kaneko et al. |
| 2002/0106165 A1 | 8/2002 | Arsenault et al. |
| 2002/0114577 A1 | 8/2002 | Kondo et al. |
| 2002/0181877 A1 | 12/2002 | Van Eck |
| 2002/0181882 A1 | 12/2002 | Hibbs-Brenner et al. |
| 2003/0007754 A1 | 1/2003 | Terashima |
| 2003/0133688 A1 | 7/2003 | Leung et al. |
| 2004/0016933 A1 | 1/2004 | Mori et al. |
| 2004/0022487 A1 | 2/2004 | Nagasaka et al. |
| 2004/0028314 A1 | 2/2004 | Lee et al. |
| 2004/0218849 A1 | 11/2004 | Blauvelt et al. |
| 2005/0013557 A1 | 1/2005 | Lu |
| 2005/0082552 A1 | 4/2005 | Fang et al. |
| 2005/0163416 A1 | 7/2005 | Yamada et al. |
| 2005/0180696 A1 | 8/2005 | Takahashi et al. |
| 2005/0238290 A1 | 10/2005 | Choudhury et al. |
| 2005/0254770 A1 | 11/2005 | Watanabe |
| 2006/0067624 A1 | 3/2006 | Towle et al. |
| 2006/0291793 A1 | 12/2006 | Carpenter et al. |
| 2007/0003205 A1 | 1/2007 | Saravanos et al. |
| 2008/0075408 A1 | 3/2008 | Cho et al. |
| 2008/0253423 A1 | 10/2008 | Kopp |
| 2008/0267557 A1 | 10/2008 | Wang et al. |
| 2009/0110354 A1 | 4/2009 | Sutherland |
| 2009/0226130 A1 | 9/2009 | Doany et al. |
| 2010/0061683 A1 | 3/2010 | Sasaki |
| 2010/0202732 A1 | 8/2010 | Sameshima et al. |
| 2010/0310214 A1 | 12/2010 | Miyadera et al. |
| 2012/0020621 A1 | 1/2012 | Zhou |
| 2012/0089180 A1 | 4/2012 | Fathi et al. |
| 2012/0163811 A1 | 6/2012 | Doany et al. |
| 2012/0207426 A1 | 8/2012 | Doany et al. |
| 2012/0219255 A1 | 8/2012 | Bradley et al. |
| 2012/0275748 A1 | 11/2012 | Yamaguchi et al. |
| 2013/0077911 A1 | 3/2013 | Doerr |
| 2013/0156365 A1 | 6/2013 | Barwicz et al. |
| 2013/0209027 A1 | 8/2013 | Yu et al. |
| 2014/0119689 A1 | 5/2014 | Yabre et al. |
| 2014/0177222 A1 | 6/2014 | Barwicz et al. |
| 2014/0177625 A1 | 6/2014 | Chang et al. |
| 2014/0179034 A1 | 6/2014 | Barwicz et al. |
| 2014/0270784 A1 | 9/2014 | Thacker et al. |

FOREIGN PATENT DOCUMENTS

| | | |
|---|---|---|
| JP | 5063419 A | 3/1993 |
| JP | 2005189730 A | 7/2005 |
| JP | 2007333982 A | 12/2007 |
| JP | 2012137538 A | 7/2012 |
| KR | 20090001169 U | 2/2009 |

OTHER PUBLICATIONS

B. G. Lee et al., "20-urn-pitch eight-channel monolithic fiber array coupling 160 Gb/s/channel to silicon nanophotonic chip," 2010 Conference on Optical Fiber Communication (OFC), collocated National Fiber Optic Engineers Conference, (OFC/NFOEC) 2010; pp. 1-3.

Barwicz et al. "Flexible Fiber to Wafer Itnerface," U.S. Appl. No. 13/428,277, filed Mar. 23, 2012, not yet published.

Barwicz, et al., "Fiber to Wafer Interface," U.S. Appl. No. 13/331,164, filed Dec. 12, 2011; not yet published.

Barwicz, et al., "Polarization-Transparent Microphotonic Devices in the Strong Confinement Limit," Nature Photonics; vol. 1; Jan. 2007; pp. 57-60.

Booth et al., "Polyguide(tm) Polymeric Technology for Optical Interconnect Circuits and Components," Proc. SPIE, vol. 3005, 1997, pp. 238-251.

OZ Optics, "V-Groove Assemblies," Datasheet DTS0083, Mar. 19, 2009, http://www.ozoptics.com/ALLNEW_PDF/DTS0083.pdf, downloaded Aug. 3, 2011; 8 pages.

Thacker et al., "Flip-Chip Integrated Silicon Photonic Bridge Chips for Sub-Picojoule Per Bit Optical Links", Proceedings 60th Electronic Compoennts and Technology Conference (ECTC), Jun. 1-4, 2010, pp. 240-243.

Tymon Barwicz, et al., "Dual-Polymer Fiber Optic Interface With Melt-Bond Adhesive," Related Application, U.S. Appl. No. 14/327,140, filed Jul. 9, 2014, pp. 1-29.

Tymon Barwicz, et al., "Fiber Optic Interface With Adhesive Fill System," Related Application, U.S. Appl. No. 14/327,117, filed Jul. 9, 2014, pp. 1-28.

Tymon Barwicz, et al., "Fiber Pigtail With Integrated Lid," Related Application, U.S. Appl. No. 13/804,269, filed Mar. 14, 2013, pp. 1-29.

Tymon Barwicz, et al., "Material Structures for Front-End of the Line Integration of Optical Polarization Splitters and Rotators," Related Application, U.S. Appl. No. 13/835,725, filed Mar. 15, 2013, pp. 1-27.

Tymon Barwicz, et al., "Material Structures for Front-End of the Line Integration of Optical Polarization Splitters and Rotators," Related Application, U.S. Appl. No. 13/971,390, filed Aug. 20, 2013, pp. 1-25.

Wang et al., "Ge-photodetectors for Si-Based Optelectronic Integration", Sensors, vol. 11, No. 1, 2011, pp. 696-718.

FIBER PIGTAIL WITH INTEGRATED LID

DOMESTIC PRIORITY

This present application is a divisional of U.S. non-provisional application Ser. No. 13/804,269 filed Mar. 14, 2013, the contents of which are incorporated by reference herein.

BACKGROUND

The present invention relates generally to fiber optic communication, and more specifically, to interfaces between an optical fiber ribbon and optical waveguides on a substrate.

Typically, fiber cables need to have connectors fitted before they can attach to other equipment. Pigtails are a solution to terminate the fiber with connectors. From a conventional view, a fiber pigtail is a single short, usually unbuffered, optical fiber that has an optical connector on one end and a length of exposed fiber at the other end. The end of the pigtail is stripped and fusion spliced to a single fiber of a multi-fiber trunk to break out the multi-fiber cable into its component fibers for connection to the end equipment. Pigtails can have female connectors and be mounted in a patch panel to allow them to be connected to endpoints or other fiber runs with patch fibers. Alternatively, the pigtails can have male connectors and plug directly into an optical transceiver.

BRIEF SUMMARY

According to an exemplary embodiment, a fiber pigtail apparatus is provided. The fiber pigtail apparatus includes a single mode fiber optic ribbon having a section of polymer ribbon removed to expose bare fibers, a fiber optic ferrule in contact with the single mode fiber optic ribbon at one distal end, and an integrated polymer lid permanently attached to the bare fibers of the single mode fiber optic ribbon at another distal end of the single mode fiber optic ribbon.

According to another exemplary embodiment, a system is provided. The system has a fiber pigtail including a single mode fiber optic ribbon having a section of polymer ribbon removed to expose bare fibers, a fiber optic ferrule in contact with the single mode fiber optic ribbon at one distal end, and an integrated polymer lid permanently attached to the bare fibers of the single mode fiber optic ribbon at an other distal end of the single mode fiber optic ribbon. The system includes another fiber optic ferrule in proximity to the fiber optic ferrule. The bare fibers held by the integrated polymer lid are proximate to single mode waveguides on a wafer as to provide optical coupling between the bare fibers and the single mode waveguides on the wafer.

According to another exemplary embodiment, a method of fabricating a fiber pigtail is provided. The method includes assembling a fiber optic ferrule to a fiber optic ribbon, with a fiber optic ribbon end protruding from the fiber optic ferrule, stripping the fiber optic ribbon end protruding from the fiber optic ferrule, cleaving the fiber optic ribbon end, and positioning the fiber optic ribbon end in a temporary V-groove to align a plane of the fiber optic ribbon end with a fixed position in the temporary V-groove. The method includes placing a polymer lid with an adhesive layer on the fiber optic ribbon end that is positioned in the temporary V-groove, applying mechanical pressure to a top surface of the polymer lid to ensure that the adhesive layer contacts a fiber surface of the fiber optic ribbon end, and removing the temporary V-groove from the fiber optic ribbon end to leave an integrated polymer lid attached to the fiber optic ribbon end.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The embodiments described herein offer methods and resultant structures for a fiber pigtail with integrated polymer lid. The fiber pigtail is an interface between an optical fiber ribbon and optical waveguides on a substrate. Embodiments define a fiber pigtail as being composed of a single-mode optical fiber or an array of single-mode optical fibers with a fiber optic connector, fiber optic ferrule, or fiber optic alignment sleeve on one end.

Fiber pigtails (also referred to as fiber optic pigtails or fiber stubs) are known in the art and the assembly of fibers to V-grooves and U-grooves defined on a substrate is known as well. The assembly of a fiber pigtail to a substrate (e.g., a wafer or waveguide) generally requires that one individually place fibers of a fiber array in corresponding grooves as the pitch in the fiber array is not well controlled and will generally not match the pitch of a groove array. Then, a glass lid is applied on top of the fibers while the fibers are maintained in the V-grooves or U-grooves. Such an approach usually requires the simultaneous use of two mechanical arms or fixtures: one mechanical arm holds the fibers properly positioned in the direction along the grooves while the other mechanical arm pushes the lid down which brings the fibers to the bottom of the grooves and, in turn, sets the transversal position of the fibers through groove-induced re-alignment.

Embodiments presented herein provide a low-cost fiber pigtail with an integrated lid. A lid has been used in fiber assemblies but the lid is a separate piece to (i.e., not integrated with and distinct from) the fiber pigtail. The integration of a lid with a fiber pigtail allows significant simplification of the assembly of a fiber ribbon to a substrate (e.g., wafer). In particular, the fiber ribbon can be held by the integrated lid with a single vacuum tip and assembled to a substrate. In addition, the lid can accurately hold fibers at pre-determined positions which enable all fibers of a fiber array to fit in a corresponding groove array within one pick and place movement. Standard microelectronic assembly tools use only one arm or fixture at a time and align components in one pick and place movement. As a second arm or fixture is not required and the fibers of an array do not need to be individually placed in the corresponding groove array in the embodiment, the integration of the lid with a fiber pigtail allows for use of standard microelectronic packaging tools for assembly of a fiber pigtail to a substrate. The enablement of assembly automation in standard microelectronic packaging tools can dramatically reduce the cost of the assembly when compared to the state of the art that requires the use of two mechanical arms (e.g., one mechanical arm holds the fibers while the other mechanical arm pushes the lid down) at a time and cannot be automated in standard microelectronic packaging tools.

Figure 1A:
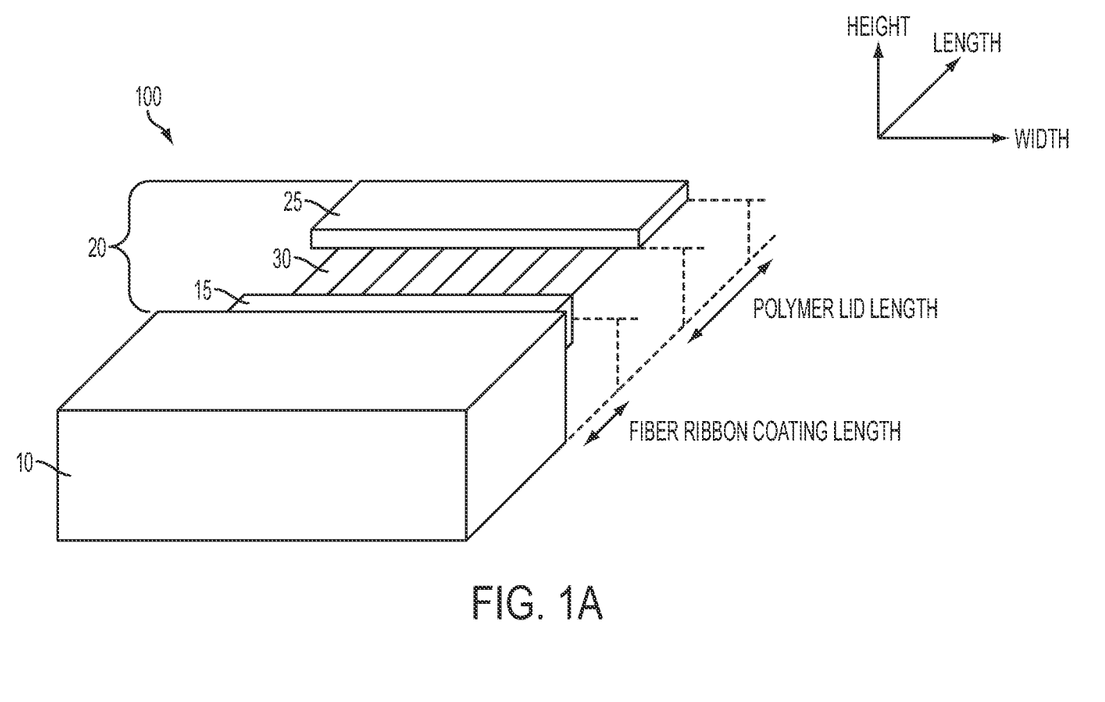
FIG. 1A illustrates a perspective view of a structure for a fiber pigtail according to an embodiment.
Figure 1B:
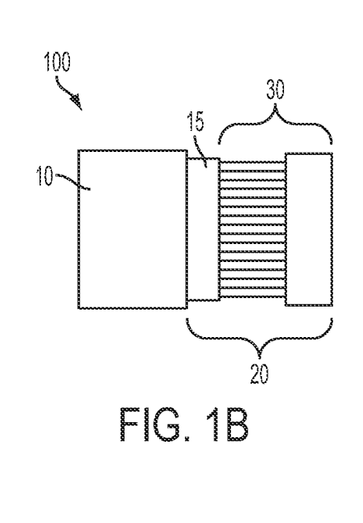
FIG. 1B illustrates a top view of the fiber pigtail according to an embodiment.
Figure 1C:
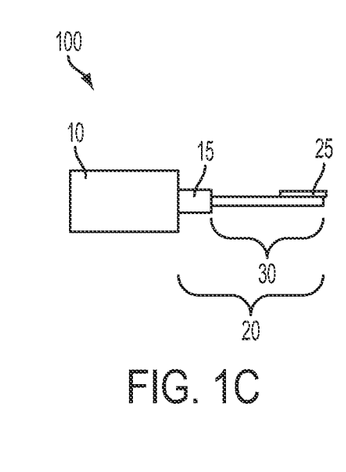
FIG. 1C illustrates a side view of the fiber pigtail according to an embodiment.

Now turning to the figures, FIG. 1A illustrates a perspective view of a structure for a fiber pigtail 100 according to an embodiment. FIG. 1B illustrates a top view of the fiber pigtail 100. FIG. 1C illustrates a side view of the fiber pigtail 100.

The fiber pigtail 100 includes a fiber optic ferrule 10, a fiber optic ribbon 20 which include bare single-mode optical fibers 30, an optical fiber ribbon coating 15 surrounding part of the fiber optic ribbon 20, and an integrated polymer lid 25 (permanently) attached to the other end of the fiber optic ribbon 20.

The fiber optic ribbon 20 is terminated on one distal end with the fiber optic ferrule 10 and on the other distal end with bare fibers 30. The integrated polymer lid 25 contacts and is bonded to the bare fibers 30. The fiber optic ribbon 20 is coated with the optical fiber ribbon coating 15 near the transition to the fiber optic ferrule 10. The fiber optic ferrule 10 also includes bare fibers (not seen) from the fiber optic ribbon 20. The fiber optic ribbon 20 runs from the fiber optic ferrule 10 and ends under the integrated polymer lid 25, and the bare fibers 30 start from the optical fiber ribbon coating 15 part and end underneath the integrated polymer lid 25. In another embodiment, the bare fibers 30 protrude beyond the polymer lid 25.

Various advantages of the integrated polymer lid 25 are now described. In one embodiment, the integrated polymer lid 25 maintains the bare fibers 30 (of the fiber optic ribbon 20) at a predetermined spacing. For example, each of the bare fibers 30 may be (permanently) attached to the polymer lid 25 at a pitch of 125 to 500 microns and preferably at a pitch of 250 microns. This allows the bare fibers 30 to be accurately spaced at a standard pitch, and be available for connection to a chip on a wafer with a matching pitch.

As one embodiment, the bare fibers 30 (of the fiber optic ribbon 20) need to be accurately positioned in matching grooves (such as U-grooves or V-grooves) to ensure the predetermined spacing. For accurate placement of the bare fibers 30 to a chip on a wafer, it is preferable to hold the bare fibers 30 as close as possible to the section of the fibers to be placed (i.e., hold the bare fibers 30 at the end/tip). However, it not possible to hold bare fibers 30 with a vacuum tip (which provides suction). However, in the embodiment, the integrated polymer lid 25 can be utilized to hold the fiber pigtail 100 at the end/tip of bare fibers 30 with a vacuum tip because the vacuum tip can suction (i.e., attach to) the integrated polymer lid 25 which is attached to the bare fibers 30. The integrated polymer lid 25 is an innovative and low-cost approach for a structure that acting as the means to hold the fiber pigtail 100 device near and/or at the bare fiber 30 section (i.e., fiber optic ribbon 20) that needs to be accurately placed (on a wafer). This improves the placement accuracy and lowers assembly cost.

The integrated polymer lid 25 may be made of polyethylene terephthalate (PET), fluorinated ethylene propylene (FEP) or other polymers. The integrated polymer lid 25 is preferably transparent to UV light in order to allow the use of a UV-curable epoxy as the adhesive to glue/attach the bare fibers 30 to backside of the integrated polymer lid 25, which allows for UV curing the UV-curable epoxy through the polymer lid 25. The bare fibers 30 of the fiber ribbon 20 are each attached/glued to the polymer lid 25 by the epoxy. Since the polymer lid 25 is transparent to UV light, once the bare fibers 30 of the fiber optic ribbon 20 are fixed in place by the UV-curable epoxy, UV light is irradiated through the polymer lid 25 onto the UV-curable epoxy to cure the UV-curable epoxy (permanently) holding the bare fibers 30.

The integrated polymer lid 25 may have a width (of or) between 0.5 millimeters (mm) and the width of the fiber optic ferrule 10, but preferably (around) 3.4 mm. The integrated polymer lid 25 may have a length (of or) between 0.5 mm and the length of the bare fibers 30 (of the fiber optic ribbon 20) but preferably 2 mm. The thickness of the integrated polymer lid 25 may be between 25 and 1000 micrometers (μm), and preferably 100 μm.

The fiber ribbon length exterior to the fiber ferrule 10 may be between 2 and 50 mm, and preferably 5 or 10 mm. The length of the fiber ribbon coating 15 may be between 0 and 50 mm, and preferably 2 to 4 mm.

Figure 2:
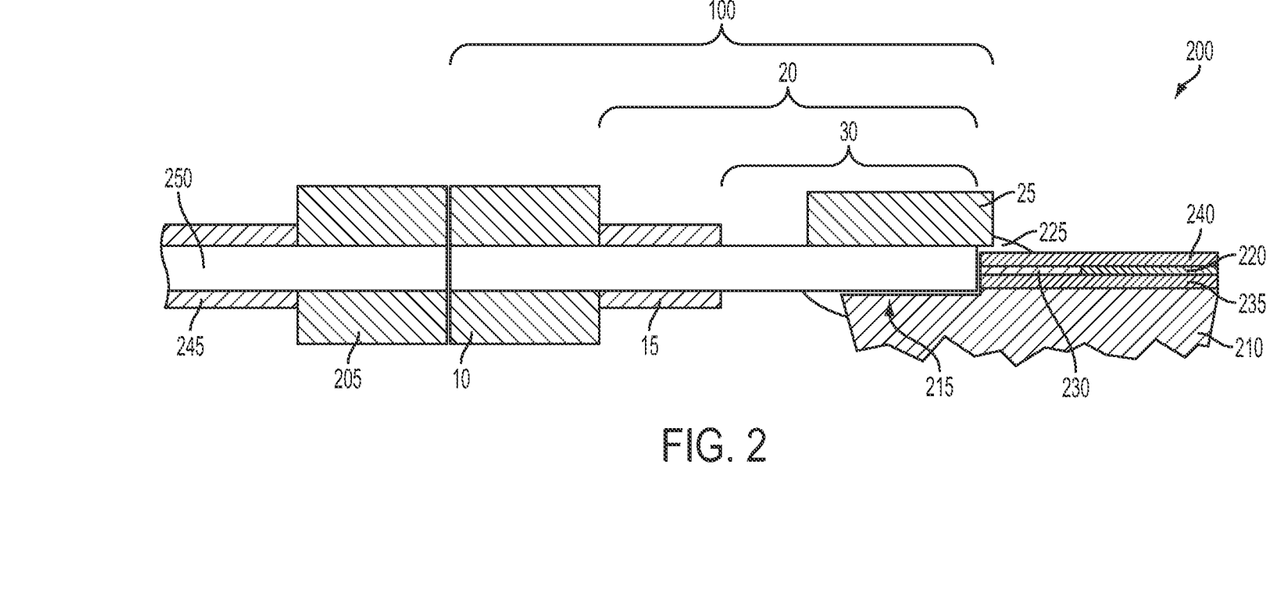
FIG. 2 illustrates a cross-sectional view of a system employing the fiber pigtail with integrated polymer lid according to an embodiment.

The fiber pigtail 100 can be incorporated into any system and be attached to a circuit on a wafer (or any type of substrate). FIG. 2 illustrates a cross-sectional view of a system 200 employing the fiber pigtail 100 with integrated polymer lid 25 according to an embodiment. As can be seen, the system 200 includes a fiber ferrule 205 in proximity (and optionally in mechanical contact) to the fiber ferrule 10 of the fiber pigtail 100 with integrated polymer lid 25. The fiber optic ferrule 205 is connected to fiber optic ribbon 250 that is covered with fiber ribbon coating 245 (as discussed above).

The fiber optic ferrule 10 and fiber optic ferrule 205 may be compatible with an MT or MPO optical connector, which is a standard known by those skilled in the art. The fiber optic ferrules 10 and 205 may include mechanical interfacing structures to align and secure in position optical fibers. An example of such interfacing structure is a pair of holes or pins as in the MT or the MPO optical connector standard known to those skilled in the art.

The system 200 includes a wafer 210. The wafer can be a diced segment of what is commonly understood as a wafer by one of ordinary skill in the art of semiconductor processing. The wafer 210 has a mechanical engagement feature 215 (e.g., a V-groove of V-groove array or a U-groove of a U-groove array) and a single-mode waveguide 220 in proximity to the bare fiber 30 end of the fiber pigtail 100 (an optionally in physical contact with end of bare fiber 30 near the cylindrical center of said fiber). Each mechanical engagement feature 215 is aligned to its own respective single-mode waveguide 220 to hold each single-mode optical bare fiber 30 in the correct position (i.e., correct predetermined spacing) for optical coupling between each single-mode bare fiber 30 and its respective single-mode waveguide 220. For example, there is an array of bare fibers 30 with each bare fiber 30 sitting in its own mechanical engagement feature 215 (i.e., each bare fiber 30 sits in its own V-groove), and the mechanical engagement features 215 are precisely aligned to their own individual single-mode waveguide 220 on the wafer 210. Accordingly, there is one groove per fiber, and an array of grooves on the wafer 210 matches an array of optical fibers 30. Accordingly, the fiber optic ribbon is a 1×N fiber optic ribbon 20, where N represents the number of individual fibers 30 in the array. A single-mode optical waveguide is a waveguide that can guide only one transverse electric mode and one transverse magnetic mode.

Glue 225 may be applied to hold the fiber pigtail 100 to the wafer 210. There is mechanical contact between a bare fiber 30 and its V-groove (which is the mechanical engagement feature 215) on the wafer 210, which can be held in place by the glue 225. Also, the tip of the bare fiber 30 is in proximity (below 100 µm and preferably (although not a necessity) below 10 µm) to its own single-mode waveguide 220. The single-mode waveguide 220 on the wafer 210 is shaped as or includes a mode size convertor, which is an optical mode converter 230, near the bare fiber 30 end of the fiber pigtail 100. Each single-mode waveguide 220 has its own optical mode converter 230. The optical mode in a single-mode bare fiber 30 may have a diameter of 3 to 15 µm and preferably 9 µm while the single-mode waveguide 220 may have a mode width or height between 0.2 µm and 2 µm and preferably close to 0.5 µm (although not a necessity). The optical mode converter 230 transitions the mode shape from the mode shape of a fiber (at the distal end of the mode converter that is in proximity to a fiber) to the mode shape of a single-mode waveguide 220, as understood by those skilled in the art.

The single-mode waveguide 220 on the wafer 210 is surrounded by a cladding material of refractive index similar to the fiber glass material of the bare fiber 30. The lower cladding 235 has a lower refractive index than the single-mode waveguide 220 (i.e., waveguide core). Upper cladding 240 has a refractive index that is lower than the single-mode waveguide 220. The upper cladding 240 may be optional.

Note that the system 200 can be seen as a method of coupling light from a fiber to a waveguide on a wafer employing a fiber pigtail with integrated lid.

Figure 3A:
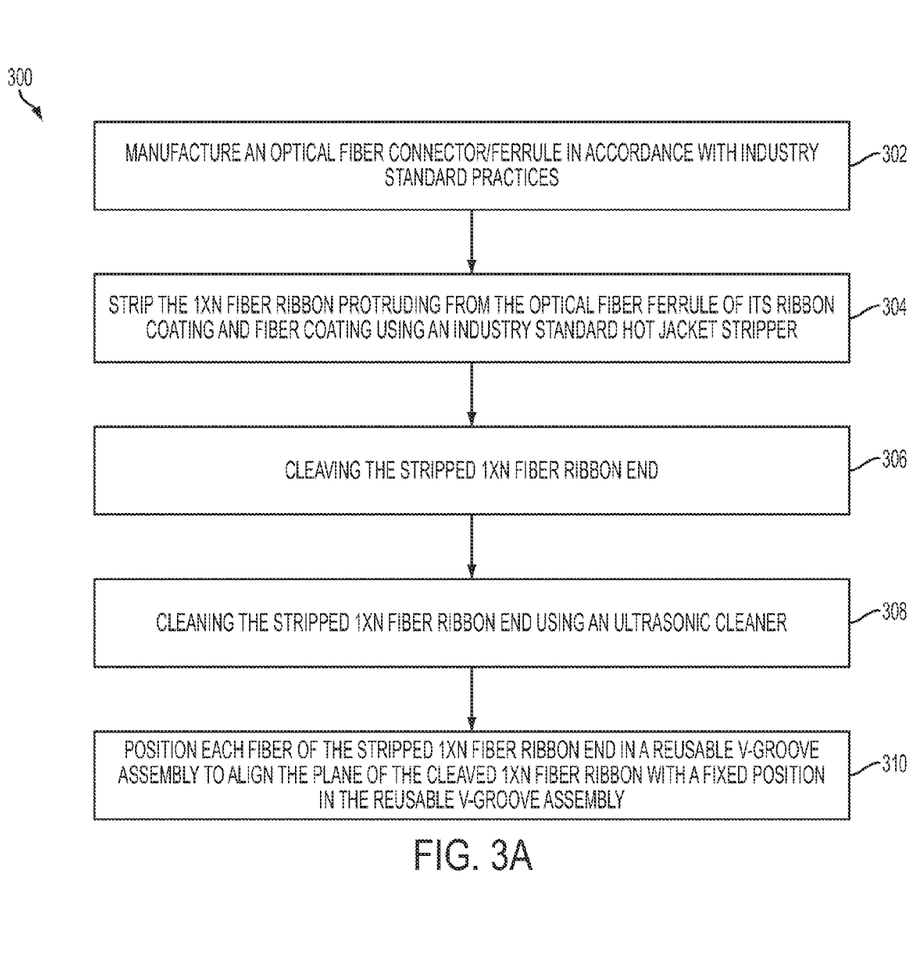
FIGS. 3A and 3B together illustrate a fabrication process for making the fiber optic pigtail with the integrated polymer lid at the cleaved fiber end according to an embodiment.
Figure 3B:
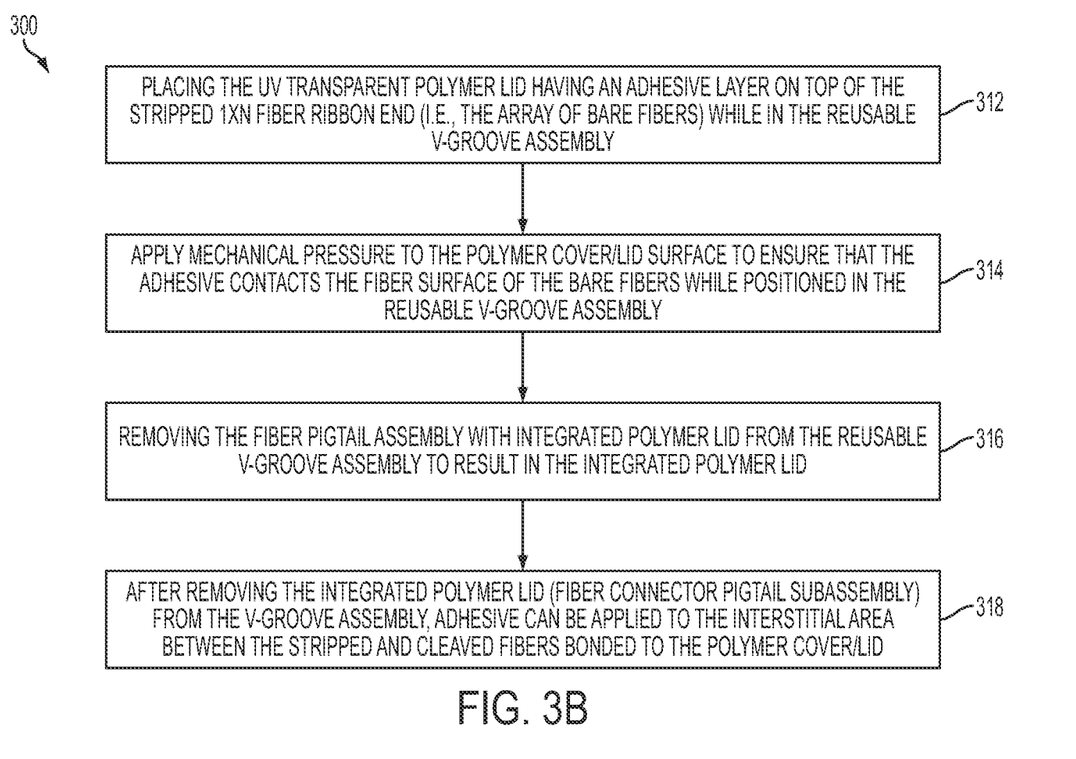

According to an embodiment, FIGS. 3A and 3B illustrate a fabrication process 300 for making the fiber optic pigtail 100 with the integrated polymer lid 25 at the cleaved fiber end.

An fiber optic ferrule 10 (also referred to as a fiber connector pigtail) is manufactured in accordance with industry standard practices (as would be understood by one skilled in the art), at operation 302. The 1×N fiber ribbon 20 is connected to the fiber optic ferrule 10 as understood by one skilled in the art.

The 1×N fiber ribbon 20 (end) protruding from the fiber optic ferrule 10 is stripped (ribbon coating and fiber coating are both removed) using an industry standard hot jacket stripper (as would be understood by one skilled in the art), at operation 304. Alternatively, it is possible to remove the ribbon coating and fiber coating using solvents or hot air ablation techniques.

The stripped 1×N fiber ribbon 20 end is cleaved at operation 306. Cleaving may be performed mechanically using a tension cleaver and/or using a $CO_2$ laser. Cleaving is the process of cutting a fiber 30.

At operation 308, the stripped 1×N fiber ribbon 20 end may be cleaned using an ultrasonic cleaner with, for instance, reagent grade acetone or isopropyl alcohol.

Figure 4A:
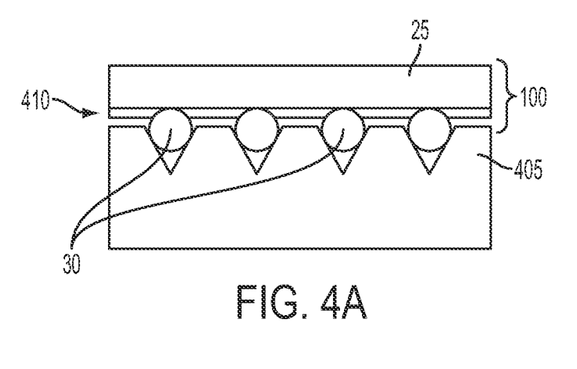
FIG. 4A illustrates part of the fiber pigtail with the integrated polymer lid fixed to the bare fibers of the fiber ribbon, while utilizing a reusable V-groove assembly to maintain the proper spacing of the bare fibers according to an embodiment.

The stripped 1×N fiber ribbon 20 end (i.e., each bare fiber 30) is placed in a reusable V-groove assembly 405 (shown in FIG. 4A) to align the plane of the cleaved 1×N fiber ribbon 20 with a fixed position in the reusable V-groove assembly 405 at operation 310. The reusable V-groove assembly 405 has individual V-grooves that fix the individual fibers 30 in place (according to a predefined spacing) as shown in FIG. 4A.

The UV transparent polymer cover/lid 25 having an adhesive layer 410 (i.e., UV curable epoxy) is placed on top of the stripped 1×N fiber ribbon 20 end (i.e., the array of bare fibers 30) while in the reusable V-groove assembly 405 at operation 312. FIG. 4A illustrates part of the fiber pigtail 100 with the integrated polymer lid 25 fixed to the bare fibers 30 of the fiber ribbon 20, while using the reusable V-groove assembly 405 to maintain the proper (predefined) spacing of the bare fibers 30.

At operation 314, a small mechanical pressure is applied to the integrated polymer cover/lid 25 surface to ensure that the adhesive of the adhesive layer 410 contacts the fiber surface of the bare fibers 30 while positioned in the reusable V-groove assembly 405. The adhesive layer 410 can be an acrylic or silicone epoxy applied on one side of the cover/lid. This adhesive must have a high bond strength and not dissociate at high temperatures (150-250 C) resultant from solder processing in microelectronics assembly. The adhesive can be UV curable. If one chooses a UV curable adhesive, an ultraviolet light is irradiated through the integrated polymer lid 25 to cure the UV curable epoxy permanently integrating the integrated polymer lid 25 to the fiber ribbon 20 as one single unit (i.e., fiber pigtail 100).

Figure 4B:
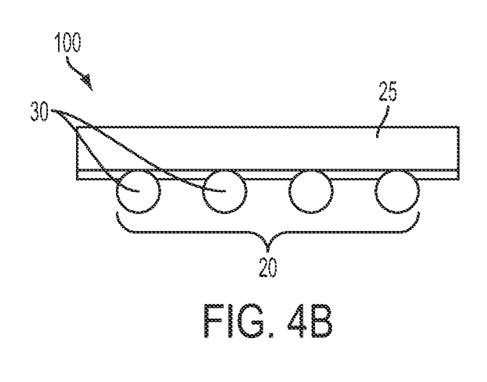
FIG. 4B illustrates the fibber ribbon end of the fiber pigtail with the integrated polymer lid, when the reusable V-groove assembly is removed according to an embodiment.

At operation 316, the fiber pigtail 100 assembly (i.e., the integrated polymer lid 25) is removed from the reusable V-groove assembly 405 resulting in the integrated polymer lid 25 (as part of the fiber pigtail 100) as shown in FIG. 4B. FIG. 4B illustrates the fiber ribbon 20 end of the fiber pigtail 100 with the integrated polymer lid 25, without the reusable V-groove assembly 405.

After removing the integrated polymer lid 25 (fiber connector pigtail subassembly) from the V-groove assembly 405, a small amount of adhesive may be applied to the interstitial area between the stripped and cleaved fibers 30 bonded to the polymer cover/lid 25, at operation 318. The fiber pigtail 100 is now assembled. The fiber pigtail 100 can be a 1×N array style fiber connector pigtail such as an MPO pigtail, an MT pigtail, and/or an MTP pigtail.

Figure 5A:
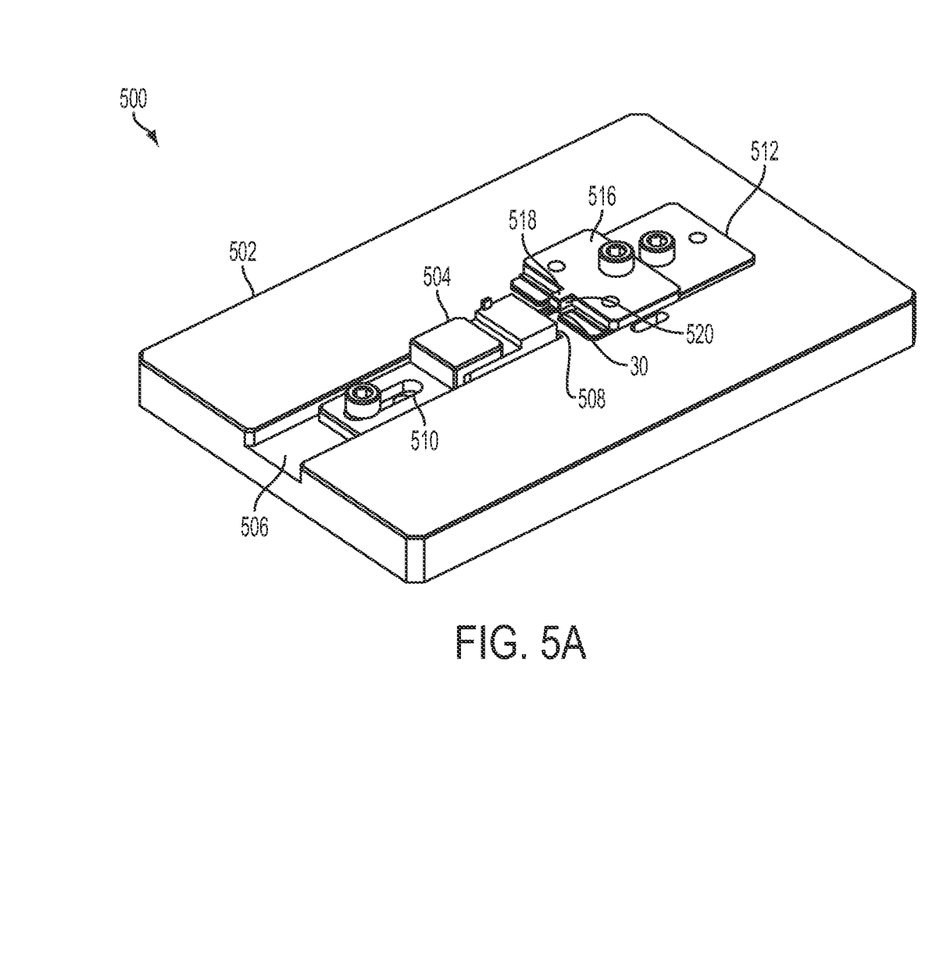
FIG. 5A illustrates a perspective view of a system for making the fiber optic pigtail according to an embodiment.
Figure 5B:
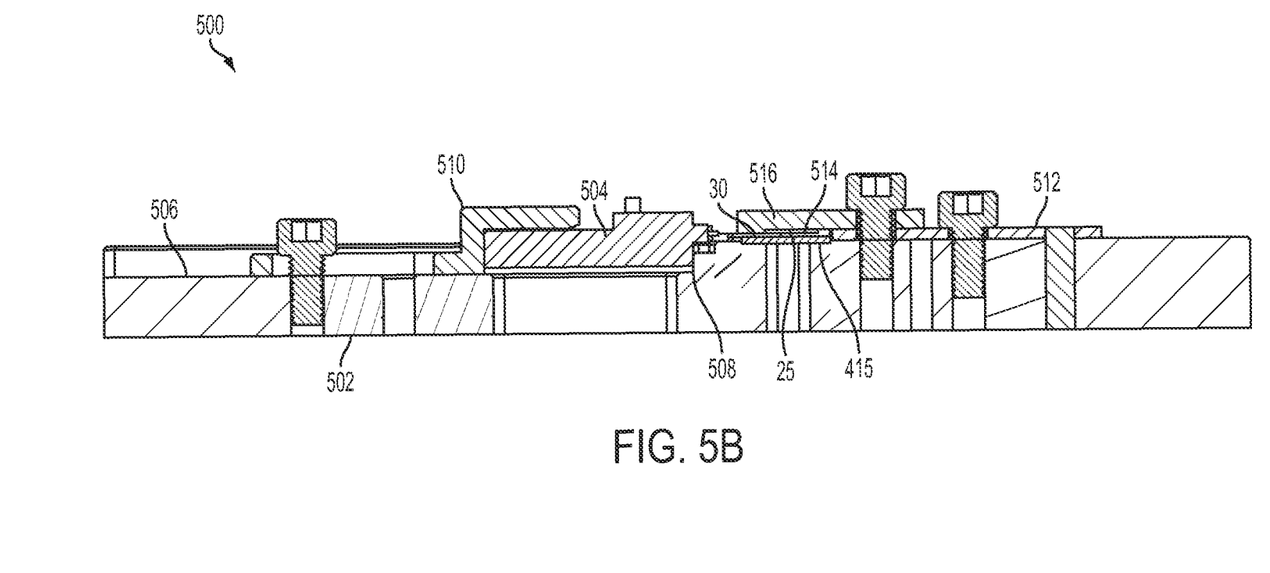
FIG. 5B illustrates a cross-sectional view of the system for making the fiber optic pigtail according to an embodiment.

FIG. 5A illustrates a perspective view of a system 500 for making the fiber pigtail 100 according to an embodiment. FIG. 5B illustrates a cross-sectional view of the system 500 for making the fiber optic pigtail 100.

With reference to FIGS. 5A and 5B, an MPO ferrule (i.e., fiber optic ferrule 10) is installed in a ferrule holder 504 of a base 502. The ferrule holder 504 is placed in a ferrule holder alignment channel 506 so that the stripped and cleaved fibers 30 are set in the V-groove (i.e., V-groove assembly 405). The ferrule holder 504 is pushed forward in the ferrule holder alignment channel 506 until fibers 30 are in the correct position in the V-groove (of the V-groove assembly 405). The ferrule holder alignment surface 508 is used to set the maximum position the fibers 30 (e.g., the fibers 30 are set in the V-grooves of the V-groove assembly 405).

The ferrule holder 504 (containing the fiber optic ferrule 10) is locked in place using the ferrule holder locking clamp 510. A front spacer plate 512 position is set to ensure the correct spacing (gap) 514 between the end of the stripped and cleaved ribbon fibers 30 of the MT ferrule (fiber optic ferrule 10) and the UV transparent polymer lid 25.

The polymer lid 25 with adhesive layer 410 is set on the stripped and cleaved ribbon fibers 30 of the MT ferrule (i.e., the fiber optic ferrule 10). The proximal surface of the front spacer plate 512 is used to align the polymer lid 25 (with adhesive layer 410) edge orthogonally to the axis of the 1×N ribbon fiber 30. A top plate 516 (which acts as mechanical pressure) is installed on the assembly. The top plate 516 has a top plate surface 518 and a top plate surface 520. A razor (or sharp instrument) is used to trim the edges of the polymer lid 25 having the adhesive layer 410.

The fully assembled fiber optic pigtail 100 with integrated polymer cover 25 is unlocked and removed from the ferrule holder alignment channel 506.

Definition of terms and parameters are provided below.

Optical fiber: Optical waveguide made of a core of arbitrary cross-sectional shape and a cladding with a circular exterior shape. The core material has a higher refractive index than the cladding material. Both the core and cladding materials need to be transparent to the optical wavelength used. In the present embodiments, single-mode fibers are preferred; i.e., optical fibers that are single mode waveguides. The fiber core and cladding material can be a glass with outer glass diameter between 50 and 125 μm and preferably 125 μm.

Fiber optic ferrule: An MT and MPO ferrule with 1×N fibers may be 6.4 mm in width and 2.5 mm in height. The range of dimensions is 1 to 20 mm in width and 0.5 to 10 mm in height.

Fiber pigtail: An optical fiber with a fiber optic connector, fiber optic ferrule, or fiber optic alignment sleeve on one end.

1×N fiber ribbon: An arrangement of N optical fibers arranged in the same plane and held in position with an epoxy.

Fiber connector pigtail: A fiber pigtail where the fiber optic connector on one end is a 1×N array style connector pigtail such as an MPO pigtail, an MT pigtail, or an MTP pigtail.

V-groove: A groove in a hard substrate with top opening of the groove larger than the bottom surface of the groove.

Adhesive on polymer lid: An acrylic or silicone epoxy applied on one side of the polymer cover/lid. This adhesive must have a high bond strength and not dissociate at high temperatures resultant from wave solder processing.

UV transparent polymer is a polymer material that is substantially transparent to electromagnetic radiation in the 300 to 450 nanometer (nm) range or 360 to 390 nm range.

UV cured epoxy is a polymeric glue that hardens when exposed to electromagnetic radiation in the 200-500 nm range and preferably in the 350 to 400 nm range.

A wafer is a planar substrate formed of either a dielectric (such as $SiO_2$) or a semiconductor material containing one or more of these elements: Si, Ge, C, In, P, Ga, and/or As.

Single mode waveguide: a waveguide that can guide only the fundamental mode of the transverse electric (TE) polarization and of the transverse magnetic (TM) polarization.

Glue: As used in the context of discussed embodiments herein is a substance that can be dispensed as a liquid and then cured to form a solid bond between elements of an assembly. As used herein, the glue must be substantially transparent to the optical wavelength of the signals guided in the waveguides. UV curing of the glue is preferred (although not a necessity).

Single-mode fiber optic ribbon is a 1×N fiber ribbon formed of single-mode optical fibers.

A method of fabricating a fiber pigtail includes assembling a fiber optic ferrule to a fiber optic ribbon, having the fiber optic ribbon end protruding from the fiber optic ferrule; stripping the fiber optic ribbon end protruding from the fiber optic ferrule; cleaving the fiber optic ribbon end; positioning the fiber optic ribbon end in a reusable (i.e., temporary V-groove) to align a plane of the fiber optic ribbon end with a fixed position in the temporary V-groove; placing a polymer lid with an adhesive layer on the fiber optic ribbon end that is positioned in the temporary V-groove; applying mechanical pressure to a top surface of the polymer lid to ensure that the adhesive layer contacts a fiber surface of the fiber optic ribbon end; and removing the temporary V-groove from the fiber optic ribbon end to leave an integrated polymer lid attached to the fiber optic ribbon end.

The fiber ribbon end that has been stripped is cleaned before being positioned in the temporary V-groove. The stripped and cleaved fibers of the fiber optic ribbon are bonded to the integrated polymer lid, and after removing the fiber pigtail from the temporary V-groove, a small amount of adhesive is applied in an interstitial area between the stripped and cleaved fibers bonded to the integrated polymer lid.

The integrated polymer lid is structured to be utilized by a vacuum suction to position fibers of the fiber optic ribbon end onto a wafer.

Spacing on the integrated polymer lid is set to a predefined amount between each of the bare fibers based on being attached to the integrated polymer lid. The predefined amount of the spacing on the integrated polymer lid is set based on a temporary V-groove.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of fabricating a fiber pigtail, the method comprising:

Assembling a fiber optic ferrule to a fiber optic ribbon, a fiber optic ribbon end protruding from the fiber optic ferrule;

Stripping the fiber optic ribbon end protruding from the fiber optic ferrule to expose bare fibers;

Cleaving the fiber optic ribbon end;

Positioning the fiber optic ribbon end in a temporary V-groove to align a plane of the fiber optic ribbon end with a fixed position in the temporary V-groove;

Placing a polymer lid with an adhesive layer on the fiber optic ribbon end that is position in the temporary V-groove;

Applying mechanical pressure to a top surface of the polymer lid to ensure that the adhesive layer contacts a fiber surface of the fiber optic ribbon end; and Removing the temporary V-groove from the fiber optic ribbon end to leave an integrated polymer lid having a flat bottom surface, the flat bottom surface being attached to the bare fibers of a fiber optic ribbon end.

2. The method of claim 1, wherein the fiber optic ribbon end that has been stripped is cleaned before being positioned in the temporary V-groove.

3. The method of claim 1, wherein stripped and cleaved fibers of the fiber optic ribbon are bonded to the integrated polymer lid;

further comprising after removing the fiber pigtail from the temporary V-groove, applying an amount of adhesive in an interstitial area between the stripped and cleaved fibers bonded to the integrated polymer lid.

4. The method of claim 1, wherein the integrated polymer lid is structured to be utilized by a vacuum suction to position fibers of the fiber optic ribbon end onto a wafer.

\* \* \* \* \*